(No Model.)
E. B. MANNING & M. SEIPS.
Tea and Coffee Pot.
No. 234,135.  Patented Nov. 9, 1880.
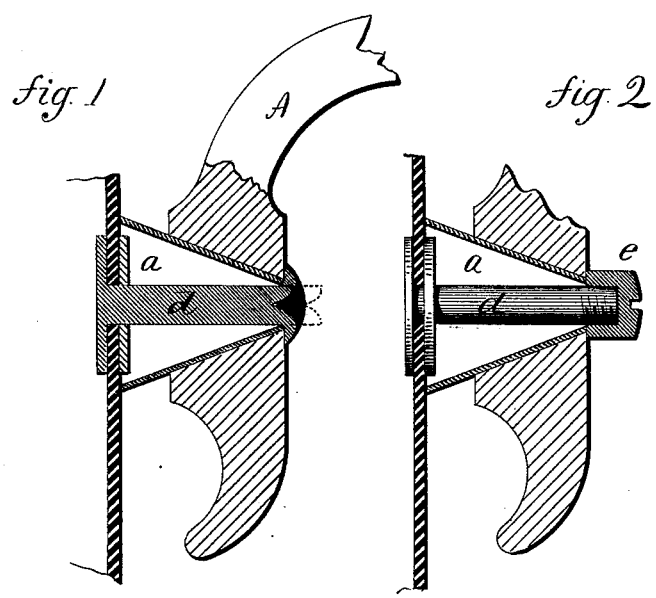

United States Patent Office.

EDWARD B. MANNING, OF NEW HAVEN, AND MICHAEL SEIPS, OF WEST MERIDEN, ASSIGNORS TO MANNING, BOWMAN & CO., OF WEST MERIDEN, CONNECTICUT.

TEA AND COFFEE POT.

SPECIFICATION forming part of Letters Patent No. 234,135, dated November 9, 1880.

Application filed September 6, 1880. (No model.)

*To all whom it may concern:*

Be it known that we, EDWARD B. MANNING, of New Haven, and MICHAEL SEIPS, of West Meriden, in the county of New Haven and State of Connecticut, have invented a new Improvement in Tea and Coffee Pots; and we do hereby declare the following, when taken in connection with the accompanying drawings and the letters of reference marked thereon, to be a full, clear, and exact description of the same, and which said drawings constitute part of this specification, and represent, in—

Figure 1, a vertical central section, and in Fig. 2 a vertical central section of a modified form of our invention.

This invention relates to an improvement in the method of attaching handles to metal tea and coffee pots and like articles, with special reference to such articles made from what is known as "granitized metal"—that is, metal coated with a mineral or vitreous glazing. In the usual construction a stud, $d$, has been soldered or attached to the pot, and over this a conical collar, $a$, has been placed, the handle A provided with corresponding perforations at its ends, placed over the collars $a$ and soldered to the studs $d$. This soldering is a difficult operation to perform, and is liable to be detached by heating the pot without water therein.

The object of this invention is to make the attachment of the handle more permanent; and it consists in the construction as hereinafter described, and particularly recited in the claim.

The studs $d$ are attached to the pot by riveting or otherwise, and preferably before the glazing is applied to the surfaces, and the collars $a$ placed thereon in the usual manner, but split at the end, the split end projecting slightly beyond the surface of the handle when placed thereon, as seen in broken lines, Fig. 1. Then the part on each side of the split is turned outward onto the surface of the handle, giving it the effect of a rivet; then the space is filled with solder. This construction forms an enlargement outside the perforation in the handle sufficient to prevent any possible detachment of the handle, and without riveting, riveting being a difficult and impracticable operation to perform in that place.

Instead of splitting and spreading the stud $d$, an enlarged end, $e$, may be screwed thereon, as seen in Fig. 2, with solder sufficient to prevent its unscrewing. This will produce an enlargement on the stud without riveting, which may serve a good purpose; yet the first described is best and preferable.

While describing this invention as applied to tea and coffee pots, it will be understood that the term tea and coffee pot embraces all analogous articles.

We claim—

The herein-described improvement in securing handles to tea and coffee pots, consisting of the studs $d$, attached to the pot, and collars $a$, the said studs extending through the perforations in the handle, and spread or enlarged on the outside without riveting, substantially as described.

EDWARD B. MANNING.
MICHAEL SEIPS.

Witnesses:
CHAS. WM. MANN,
C. W. ANDERSON.